Figure 2:
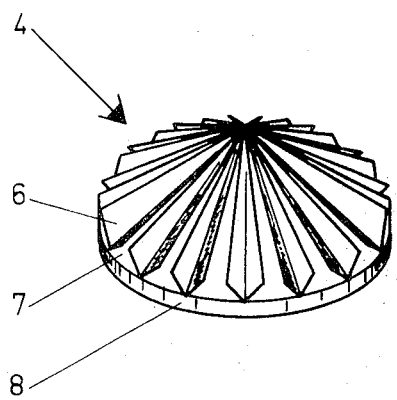

United States Patent
Ahlborg

[11] 3,835,624
[45] Sept. 17, 1974

[54] GAS TREATMENT APPARATUS

[75] Inventor: Leif Arne Ahlborg, Saltsjo-Boo, Sweden

[73] Assignee: Alfa-Laval AB, Tumba, Sweden

[22] Filed: Aug. 27, 1971

[21] Appl. No.: 175,655

[30] Foreign Application Priority Data
Aug. 28, 1970 Sweden.............................. 11703/70

[52] U.S. Cl........................... 55/220, 55/87, 55/233, 261/DIG. 26
[51] Int. Cl.............................................. B01d 47/04
[58] Field of Search ............. 55/240, 241, 233, 220, 55/87, 256, 260; 261/111, DIG. 9, DIG. 26

[56] References Cited
UNITED STATES PATENTS
1,836,338  12/1931  Rodman et al. ...................... 55/193
3,360,247  12/1967  Waldhofer ......................... 55/240 X
3,611,592  10/1971  Stocchi et al. ........................ 55/240
3,680,282   8/1972  Kent .................................... 55/233

Primary Examiner—Frank W. Lutter
Assistant Examiner—William Cuchlinski, Jr.
Attorney, Agent, or Firm—Cyrus S. Hapgood

[57] ABSTRACT

The gas to be purified is caused to flow upward in a vertical passage through a foam layer supported by perforated means situated in the gas passage. The perforated foam-supporting means comprises a conical element having open channels on its upper surface and forming openings for through-flow of the gas between these channels.

12 Claims, 2 Drawing Figures

PATENTED SEP 17 1974   3,835,624

GAS TREATMENT APPARATUS

The present invention relates to an apparatus in which a gas is caused to flow from below and upward in a vertical passage through a foam layer that is supported by a perforated element situated in the gas passage.

A previously known method of gas purification resides in causing the gas to flow from beneath through a perforated plate, and maintaining a layer of a purifying liquid on the upper surface of the plate. It has also been proposed to add to this purifying liquid a foam-forming agent, so that the through-flowing gas creates a foam layer upon the liquid layer. In this way, conditions are provided for a very intimate contact between the gas and the purifying liquid.

This method of purifying gases, although seemingly perfect, has actually proved unusable for certain processes, because of too great a pressure drop for the gas to be purified when flowing through the perforated plate and the liquid layer, the plate being necessarily provided with only small apertures. Accordingly, it has been proposed that the gas be caused to flow through a foam made independently of the gas rather than a foam formed in the above-described manner. This makes it possible to eliminate the use of a plate for supporting the liquid layer, having only small apertures, and to use instead a net or other means having relatively large meshes for supporting the foam thus made outside the gas passage. However, this arrangement creates new problems which were not known before, and it is to the solution of these problems that the present invention is directed.

One such problem is that during the operation of the apparatus, liquid constituting broken-down deteriorated foam will drip or run straight through the foam supporting element all over the cross-section of the gas passage. Accordingly, special means must be arranged beneath the foam supporting element for collecting and leading away consumed foam. Thus, it is quite impossible to place a treatment apparatus of this kind directly upon a chimney, for instance, and to let the chimney gases pass straight upward continuously without meeting a substantial through-flow resistance.

This problem has now been solved, however, by the present invention, according to which the means for supporting the foam, provided with through flow openings for the gas, is formed as a conical element having open channels in its upper surface between the through flow openings for the gas. It has been found that even if this conical element is provided with large through-flow openings for the gas, the broken-down foam (i.e., the liquid) will end up in these open channels and may be led away from the gas passage without passing through the foam supporting element, due to the conical shape of the latter.

Another such problem is to obtain an even distribution of the gas in the foam, so that the gas will not concentrate at one part of the gas passage and form a hole straight through the foam layer. The aforementioned conical shape of the foam-supporting element has proved to contribute in causing a good distribution of the gas in the foam. A still better distribution is obtained, however, when the through-flow openings of the element are made in the form of regularly distributed slots around the center of the passage, these slots extending between the central part and the peripheral part of the gas passage. Preferably, the underneath side of the element portions situated between the slots, as seen in cross-section, have surfaces diverging upward against the slots.

In a preferred embodiment, the conical element consists of thin material, such as thin plate, the edges of the thin material defining the slots being bent upward against the foam.

Preferably, the apex of the conical element is turned upward, so that liquid will run outward against the peripheral wall of the gas passage and be collected and led away from there. However, it is also possible to have the lowest point of the foam supporting element situated in the center of the gas passage, and to lead away broken-down foam from there. Of course, most of the liquid caught by the foam-supporting element will flow upon the upper surface of this element in the open channels formed by the bent edges thereof. However, a smaller quantity of the liquid may flow over these edges defining the slots. This may happen especially when the gas stream through the apparatus is not very strong, or when the apparatus is shut off and the foam is to be broken down, as in connection with cleaning of the apparatus. By virtue of the inclination of the different parts of the foam-supporting element, due to its conical form, this smaller liquid quantity will run on the underneath side of the foam-supporting element to the same place as the rest of the liquid, and can be led away together with this liquid from the gas passage.

In order to facilitate the through-flow of gas, the thin material of the foam-supporting element preferably is bent so that sharp edges are formed between the slots on the underneath side of the cone. In a preferred embodiment, which is described in detail below, the cone is assembled by a number of strips of thin material formed as upwardly open channels. These channels have a substantially V-shaped cross-section, which has proved to give a small pressure drop for the gas and also a favorable turbulence and a good distribution of the gas in the foam.

In a preferred embodiment of the foam-supporting element, the width of the aforementioned open channels, as well as the width of the slots therebetween, increases from the central part to the peripheral part of the gas passage. This feature also has proved to contribute in giving a good distribution of the gas in the foam.

Figure 1:
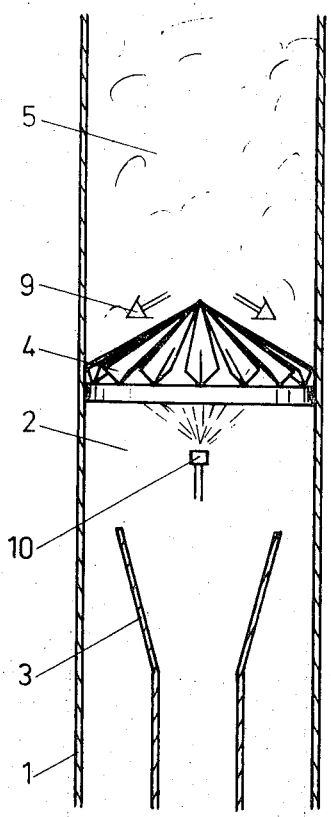

In the following, a preferred embodiment of the present invention is described with reference to the accompanying drawing, in which FIG. 1 is a vertical sectional view, partly in elevation, of such embodiment, and FIG. 2 is a perspective view of the foam-supporting element shown in FIG. 1.

In FIG. 1, a tube 1 is shown forming a vertical gas passage 2, in which opens a supply conduit 3 for gas to be freed from dust particles. Above the opening of the gas supply conduit 3, an element 4 is situated in the gas passage. The element 4 supports a layer 5 of foam which has been formed outside the gas passage and then supplied to it in any suitable manner.

As shown particularly in FIG. 2, the foam-supporting element 4 comprises a number of open channels 6 which are V-shaped in cross-section and which are made from a thin sheet material. The channels 6 are assembled to provide the element 4 with a generally conical shape. More particularly, each channel 6 has a width which decreases toward the cone's apex, which is located on the central vertical axis of the tube 1 (FIG. 1); and the channels 6 extend downwardly and outwardly from this apex while diverging from each other so as to form slots 7 between adjacent channels. Thus, each slot 7 also has a width which decreases toward the apex of the cone. At their outer (lower) ends, the channels 6 are connected to a ring 8 positioned against the inner wall of tube 1.

By means of arrows, FIG. 1 illustrates how gas flows from conduit 3 through the slots 7 in the element 4 and through the foam layer 5. The additional arrows 9 illustrate how liquid consisting of broken-down foam flows downward and outward along channels 6 of the conical element 4 and then downward against the periphery of the gas passage 2 to a bottom outlet (not shown).

As shown in FIG. 1, a spray nozzle 10 is located just beneath the element 4 in the gas passage 2. From this nozzle, liquid may be sprayed through the conical element 4 against the foam layer 5 when the latter is to be broken down rapidly, as in connection with cleaning of the apparatus. Due to the conical shape of element 4, this liquid, even when supplied in a relatively large amount, is prevented from returning downward through the element 4 and entering the gas supply conduit 3.

I claim:

1. Apparatus of the character described having means forming a vertical passage for upward flow of a gas, perforated means in said passage for supporting a foam layer through which the gas flows upwardly, said foam-supporting means comprising a conical element forming through-flow openings for the gas and having open channels on its upper surface between said through-flow openings, and a layer of foam supported on said perforated means.

2. Apparatus according to claim 1, in which said through-flow openings are slots which extend between the central part and the peripheral part of the gas passage and which are regularly distributed around the center of the gas passage.

3. Apparatus according to claim 2, in which said element consists of flexible material, the edges of the flexible material defining said slots being bent upward toward the foam.

4. Apparatus according to claim 2, in which sharp edges are formed on the underneath sides of the element portions forming said channels.

5. Apparatus according to claim 2, in which said slots extend radially from the apex of the conical element.

6. Apparatus according to claim 2, in which each of said slots extends substantially from the center to the periphery of the gas passage.

7. Apparatus according to claim 2, in which the width of each slot increases from the center to the periphery of the gas passage.

8. Apparatus according to claim 1, in which each said channel is formed by a portion of said element which, as viewed in a cross-section of the channel, has lower surfaces diverging upward toward adjacent through-flow openings.

9. Apparatus according to claim 1, in which the apex of the conical element is directed upward.

10. Apparatus according to claim 1, in which said conical element includes a number of strips of material forming said open channels.

11. Apparatus according to claim 10, in which said open channels are V-shaped in cross-section.

12. Apparatus of the character described having means forming a vertical passage for upward flow of a gas, perforated means in said passage for supporting a foam layer through which the gas flows upwardly, said foam-supporting means comprising a conical element forming through-flow openings for the gas and having open channels on its upper surface between said through-flow openings, a layer of foam supported on said perforated means, a gas supply duct for introducing said gas into the lower portion of said passage, and a liquid spray nozzle mounted in said passage and located between the gas supply duct and said conical element, said nozzle being directed to spray liquid through said through-flow openings and against said foam layer, said channels of the conical element extending to the periphery of said vertical passage.

* * * * *